United States Patent
Kim et al.

(10) Patent No.: US 10,091,526 B2
(45) Date of Patent: Oct. 2, 2018

(54) METHOD AND APPARATUS FOR MOTION VECTOR ENCODING/DECODING USING SPATIAL DIVISION, AND METHOD AND APPARATUS FOR IMAGE ENCODING/DECODING USING SAME

(75) Inventors: Sunyeon Kim, Seoul (KR); Jeongyeon Lim, Seongnam-si (KR); Gyumin Lee, Seongnam-si (KR); Jaehoon Choi, Seongnam-si (KR); Yoonsik Choe, Goyang-si (KR); Yungho Choi, Anyang-si (KR); Yonggoo Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 1190 days.

(21) Appl. No.: 13/504,812

(22) PCT Filed: Oct. 1, 2010

(86) PCT No.: PCT/KR2010/006738
§ 371 (c)(1),
(2), (4) Date: Jul. 17, 2012

(87) PCT Pub. No.: WO2011/052897
PCT Pub. Date: May 5, 2011

(65) Prior Publication Data
US 2012/0275522 A1 Nov. 1, 2012

(30) Foreign Application Priority Data
Oct. 28, 2009 (KR) .................. 10-2009-0102660

(51) Int. Cl.
*H04N 19/567* (2014.01)
*H04N 19/52* (2014.01)

(52) U.S. Cl.
CPC .......... *H04N 19/567* (2014.11); *H04N 19/52* (2014.11)

(58) Field of Classification Search
CPC .. H04N 7/50; H04N 7/32; H04N 7/24; H04N 19/52; H04N 19/567
(Continued)

(56) References Cited

U.S. PATENT DOCUMENTS

| 6,842,483 | B1 * | 1/2005 | Au | H04N 19/533 375/240.16 |
| 2004/0165664 | A1 * | 8/2004 | Karczewicz | H04N 19/147 375/240.16 |

(Continued)

FOREIGN PATENT DOCUMENTS

| JP | 2007142883 | 6/2007 |
| JP | 2009-005276 | 1/2009 |

(Continued)

OTHER PUBLICATIONS

Korean Office Action for application dated Jan. 21, 2014, citing the above reference(s).
(Continued)

*Primary Examiner* — Marnie A Matt
(74) *Attorney, Agent, or Firm* — Hauptman Ham, LLP

(57) ABSTRACT

Disclosed is a method for encoding a motion vector by using spatial division, the method comprises: aggregating predicted motion vector candidates of a current block into a plurality of groups; selecting representative predicted motion vectors for respective groups by selecting one of aggregated predicted motion vector candidates within the respective groups as representative predicted motion vector; selecting single representative predicted motion vector from the representative predicted motion vectors for the respective groups as a predicted motion vector; and encoding a (Continued)

differential vector representing difference between a current motion vector of the current block and a selected predicted motion vector.

10 Claims, 11 Drawing Sheets

(58) Field of Classification Search
USPC .................. 375/240.16, E07.243, E07.105
See application file for complete search history.

(56) References Cited

U.S. PATENT DOCUMENTS

| | | | | |
|---|---|---|---|---|
| 2005/0053137 | A1* | 3/2005 | Holcomb | H04N 19/52 375/240.16 |
| 2005/0053292 | A1* | 3/2005 | Mukerjee | H04N 19/105 382/236 |
| 2005/0249284 | A1* | 11/2005 | Lee | G06T 7/2073 375/240.16 |
| 2007/0140342 | A1* | 6/2007 | Karczewicz | H04N 19/147 375/240.12 |
| 2007/0183499 | A1* | 8/2007 | Kimata | H04N 19/597 375/240.16 |
| 2008/0267292 | A1* | 10/2008 | Ito | H04N 19/52 375/240.16 |
| 2009/0010553 | A1* | 1/2009 | Sagawa | H04N 19/52 382/236 |
| 2009/0016430 | A1* | 1/2009 | Schmit | H04N 19/176 375/240.01 |
| 2009/0304084 | A1* | 12/2009 | Hallapuro | H04N 19/52 375/240.16 |
| 2010/0080296 | A1* | 4/2010 | Lee | H04N 19/52 375/240.16 |
| 2010/0220790 | A1* | 9/2010 | Jeon | H04N 19/55 375/240.16 |
| 2011/0176615 | A1* | 7/2011 | Lee | H04N 19/52 375/240.16 |
| 2013/0279596 | A1* | 10/2013 | Gisquet | H04N 19/00854 375/240.16 |

FOREIGN PATENT DOCUMENTS

| | | | | |
|---|---|---|---|---|
| JP | 2009-147757 | | 7/2009 | |
| WO | 2007/049432 | | 5/2007 | |
| WO | WO-2009-051419 | * | 4/2009 | ............... H04N 7/32 |

OTHER PUBLICATIONS

International Search Report dated Jun. 3, 2011 for PCT/KR2010/006738, citing the above references.

* cited by examiner

METHOD AND APPARATUS FOR MOTION VECTOR ENCODING/DECODING USING SPATIAL DIVISION, AND METHOD AND APPARATUS FOR IMAGE ENCODING/DECODING USING SAME

CROSS REFERENCE TO RELATED APPLICATION

This application claims the priority of Korean Patent Application No. 10-2009-0102660, filed on Oct. 28, 2009 in the KIPO (Korean Intellectual Property Office). Further, this application is the National Phase application of International Application No. PCT/KR2010/006738 filed Oct. 1, 2010, which designates the United States and was published in Korean.

TECHNICAL FIELD

The present disclosure relates to a method and an apparatus for encoding/decoding a motion vector by using spatial division, and a method and an apparatus for encoding/decoding a video using the same. More particularly, the present disclosure relates to a method and an apparatus for improving the video compression efficiency by efficiently compressing a motion vector used for predictive encoding of a video.

BACKGROUND

The statements in this section merely provide background information related to the present disclosure and may not constitute prior art.

When a conventional video compression technique such as H.264/AVC is to perform a predictive encoding on a motion vector obtained by a block based motion estimation, a median of motion vectors of neighboring blocks of a block to be encoded is used to determine a predicted motion vector, and a variable-length encoding is performed on a differential between a motion vector to be encoded and the predicted motion vector to compress the motion vector.

ITU-T VCEG (International Telecommunications Union-Telecommunication Video Coding Expert Group) has studied a better performance codec by the name of KTA (Key Technical Area) based on existing H.264/AVC, and used a method called MVComp (Competition-based Motion Vector Coding) to improve the existing motion vector encoding method of H. 264/AVC.

MVComp is to have a number of predicted motion vector candidates and select one that produces a least differential between a current motion vector and an acquired motion vector after a prediction to supply a decoder with information of the selected predicted motion vector candidate, achieving an improvement in encoding the compression efficiency by 5% compared to that of existing H.264/AVC. However, MVComp has a drawback of an increased quantity of indexing side information to be transmitted to the decoder as the number of predicted motion vector candidates increases.

In this respect, one of proposed techniques has an encoder select one motion vector from a plurality of predicted motion vector candidates, which is presumably the most similar to a current motion vector, and transmits side information for identifying solely whether the selected motion vector is an optimum motion vector. However, the proposed techniques have limitations that result in a decoder crash problem of an error generated in a previous frame disabling reconstructions of the current frame and frames ahead of a next intra frame and the increase of the computational load on the decoder.

Accordingly, there have been proposed methods of determining the is current block motion vector by using motion vectors around the current block to be encoded. The methods address the decoder crash problem by efficiently transmitting indexing side information by using the motion vectors of neighboring blocks and selecting a predicted motion vector apart from information on a previous frame. However, since the methods use a limited number of motion vector candidates, the compression performance is disadvantageously limited.

DISCLOSURE

Technical Problem

Therefore, the present disclosure has been made in view of the above mentioned problems to provide a method and an apparatus for efficiently compressing a motion vector by decreasing the quantity of encoded bits while encoding a motion vector by using a predicted motion vector which is more similar to the motion vector to be encoded and thus improving the video compression efficiency.

SUMMARY

An embodiment of the present disclosure provides an apparatus for encoding a motion vector, the apparatus including: a predicted motion vector candidate aggregator for aggregating predicted motion vector candidates of a current block into a plurality of groups; a representative predicted motion vector selector for selecting representative predicted motion vectors for respective groups by selecting one predicted motion vector candidate from aggregated predicted motion vector candidates within the respective groups as a representative predicted motion vector; a predicted motion vector selector for selecting a single representative predicted motion vector from the representative predicted motion vectors for the respective groups as a predicted motion vector; and a differential vector encoder for encoding a differential vector representing a difference between a current motion vector of the current block and a selected predicted motion vector.

Another embodiment of the present disclosure provides a video is encoding apparatus, including: a video encoder for determining a current motion vector representing a motion vector of a current block and for performing a predictive encoding on the current block by using the current motion vector; and a motion vector encoder for generating a motion vector data by selecting representative predicted motion vectors for respective groups in plural number, in which predicted motion vector candidates of the current block are aggregated based on spatial positions, selecting a single representative predicted motion vector from the representative predicted motion vectors for the respective groups as a predicted motion vector, and encoding a differential vector representing a difference between a determined current motion vector and a selected predicted motion vector and a group index indicating a group including a selected single representative predicted motion vector.

Yet another embodiment of the present disclosure provides an apparatus for decoding a motion vector, the apparatus including: a predicted motion vector candidate aggregator for aggregating predicted motion vector candidates of a current block into a plurality of groups; a representative predicted motion vector selector for selecting representative predicted motion vectors for respective groups by selecting a single predicted motion vector candidate from aggregated predicted motion vector candidates within the respective groups as a representative predicted motion vector; a predicted motion vector reconstructor for reconstructing a group index by decoding a group index data extracted from a motion vector data and selecting the representative predicted motion vector of a group identified by a reconstructed group index from the representative predicted motion vectors for the respective groups, as a predicted motion vector; and a current motion vector reconstructor for reconstructing a differential vector by decoding a differential vector data extracted from the motion vector data and reconstructing a reconstructed differential vector and a selected predicted motion vector as a current motion vector of the current block.

Yet another embodiment of the present disclosure provides a video decoding apparatus, including: a motion vector decoder for reconstructing a current motion vector of a current block by reconstructing a differential vector and a group index through decoding a motion vector data extracted from a bitstream, selecting representative predicted motion vectors for respective groups in plural number, in which predicted motion vector candidates of the current block are aggregated based on spatial positions, selecting the representative predicted motion vector of a group identified by a reconstructed group index from the representative predicted motion vectors of the respective groups, as a predicted motion vector, and adding a reconstructed differential vector to a selected predicted motion vector; and a video decoder for reconstructing the current block by performing a predictive decoding on an image data extracted from the bitstream by using a reconstructed current motion vector.

Yet another embodiment of the present disclosure provides a method of encoding a motion vector, the method including: aggregating predicted motion vector candidates of a current block into a plurality of groups; selecting representative predicted motion vectors for respective groups by selecting a single predicted motion vector candidate from aggregated predicted motion vector candidates within the respective groups as a representative predicted motion vector; selecting a single representative predicted motion vector from the representative predicted motion vectors for the respective groups as a predicted motion vector; and encoding a differential vector representing a difference between a current motion vector of the current block and a selected predicted motion vector.

Yet another embodiment of the present disclosure provides a video encoding method, including: determining a current motion vector representing a motion vector of a current block; performing a predictive encoding on the current block by using a determined current motion vector; selecting representative predicted motion vectors for respective groups in plural number, in which predicted motion vector candidates of the current block are aggregated based on spatial positions; selecting a single representative predicted motion vector from the representative predicted motion vectors for the respective groups as a predicted motion vector; and encoding a differential vector representing a difference between a determined current motion vector and a selected predicted motion vector and a group index indicating a group including a selected single is representative predicted motion vector.

Yet another embodiment of the present disclosure provides a method of decoding a motion vector, the method including: reconstructing a differential vector and a group index by decoding a differential vector data and a group index data extracted from a motion vector data; aggregating predicted motion vector candidates of a current block into a plurality of groups; selecting representative predicted motion vectors for respective groups by selecting a single predicted motion vector candidate from aggregated predicted motion vector candidates within the respective groups as a representative predicted motion vector; selecting the representative predicted motion vector of a group identified by a reconstructed group index from the representative predicted motion vectors for the respective groups, as a predicted motion vector; and reconstructing a current motion vector of the current block by adding a reconstructed differential vector to a selected predicted motion vector.

Yet another embodiment of the present disclosure provides a video decoding method, including: reconstructing a differential vector and a group index by decoding a motion vector data extracted from a bitstream; selecting representative predicted motion vectors for respective groups in plural number, in which predicted motion vector candidates of a current block are aggregated based on spatial positions; selecting the representative predicted motion vector of a group identified by a reconstructed group index from the representative predicted motion vectors for the respective groups, as a predicted motion vector; reconstructing a current motion vector of the current block by adding a reconstructed differential vector to a selected predicted motion vector; and reconstructing the current block by performing a predictive decoding on an image data extracted from the bitstream by using a reconstructed current motion vector.

Advantageous Effects

According to the present disclosure as described above, a quantity of bits generated due to an encoding of a side information for indicating which predicted motion vector is selected may be controlled while a size of a differential vector to be encoded is reduced by selecting a predicted motion vector by using a plurality of predicted motion vector candidates, thereby improving the efficiency of the encoding of the motion vector and thus ultimately improving the compression efficiency of a video.

DETAILED DESCRIPTION

Figure 1:
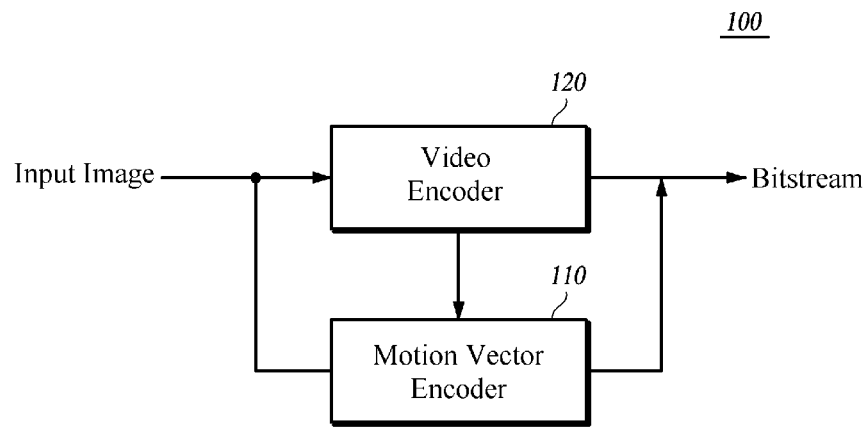
FIG. 1 is a block diagram schematically illustrating a video encoding apparatus according to an embodiment of the present disclosure.

Hereinafter, embodiments of the present disclosure will be described in is detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

A motion vector encoding apparatus, a motion vector decoding apparatus, a video encoding apparatus, and a video decoding apparatus described hereinafter may be user terminals including a personal computer or PC, notebook or laptop computer, personal digital assistant or PDA, portable multimedia player or PMP, PlayStation Portable or PSP, or mobile communication terminal, or server terminals including an application server and a service server, and represent a variety of apparatuses equipped with, for example, a communication device such as a modem for carrying out communication between various devices or wired/wireless communication networks, a memory for storing various programs for encoding or decoding a motion vector or encoding or decoding a video and related data, and a microprocessor for executing the programs to effect operations and controls.

In addition, the motion vector or the video encoded into a bitstream by the motion vector encoding apparatus or the video encoding apparatus may be is transmitted in real time or non-real-time to the motion vector decoding apparatus and the video decoding apparatus, so that the encoded motion vector is reconstructed as a motion vector by decoding in the motion vector decoding apparatus or the encoded video is reconstructed into the video by decoding in the video decoding apparatus, and thus the motion vector or the video is reproduced.

A video typically includes a series of pictures each of which is divided into predetermined areas, such as blocks. When each picture is divided into blocks, each of the blocks is classified into an intra block or an inter block depending on an encoding method. The intra block means a block that is encoded through an intra predictive encoding which is within a current picture where the current encoding is performed for generating a predicted block by predicting a current block using pixels of a reconstructed block that underwent previous encoding and decoding and then encoding the differential value of the predicted block from the pixels of the current block. The inter block means a block that is encoded through an inter predictive encoding which generates the predicted block by predicting the current block in the current picture through referencing one or more past pictures or future pictures and then encoding the differential value of the predicted block from the current block. Here, the picture that is referenced in encoding or decoding the current picture is called a reference picture.

FIG. 1 is a block diagram for schematically illustrating a video encoding apparatus according to an aspect of the present disclosure.

The video encoding apparatus 100 according to another aspect of the present disclosure, which is an apparatus for encoding a video, includes a motion vector encoder 110 and a video encoder 120.

The motion vector encoder 110 selects representative predicted motion vectors for respective groups in which predicted motion vector candidates of a current block are aggregated based on spatial positions, selects one representative predicted motion vector from the representative predicted motion vectors for the respective groups, and encodes a differential vector that is a difference between a current motion vector and the selected predicted motion is vector and a group index indicating a group including the selected one representative predicted motion vector. The differential vector is generated as a differential vector data through the encoding and the group index is generated as a group index data through the encoding.

Accordingly, the motion vector encoder 110 generates a motion vector data including the differential vector data and the group index data. Here, the motion vector encoder 110 generates the differential vector by using a current motion vector determined for performing a predictive encoding on a current block by the video encoder 120. The motion vector encoder 110 will be described in the following process with reference to FIGS. 2 to 6 in detail.

The video encoder 120 determines a current motion vector that is a motion vector of the current block and performs a predictive encoding on the current block by using the current motion vector. As such, by performing the predictive encoding on the current block, an image data is generated.

To this end, the video encoder 120 may include a predictor, a subtracter, a transformer and quantizer, and an encoder, and further include an inverse transformer and inverse quantizer, an adder, a deblocking filter, a memory, etc. Here, the predictor generates a predicted block by determining the current motion vector through estimation of a motion of the current block and compensating for the motion of the current block by using the determined motion vector. The subtracter generates a residual block by subtracting the predicted block from the current block. The transformer and quantizer generates a transformed and quantized coefficient by transforming and quantizing the residual block. The encoder generates the image data by encoding the transformer and quantized coefficient. Further, the inverse quantizer and inverse transformer reconstruct the residual block by inversely quantizing and inversely transforming the transformed and quantized coefficient. The adder reconstructs the current block by reconstructing the predicted block and the reconstructed residual block. The reconstructed current block is deblocking-filtered by a deblocking filter, accumulated in the memory in the unit of pixels, and stored as a reference picture, and is used for prediction of a next block or a next picture.

Figure 2:
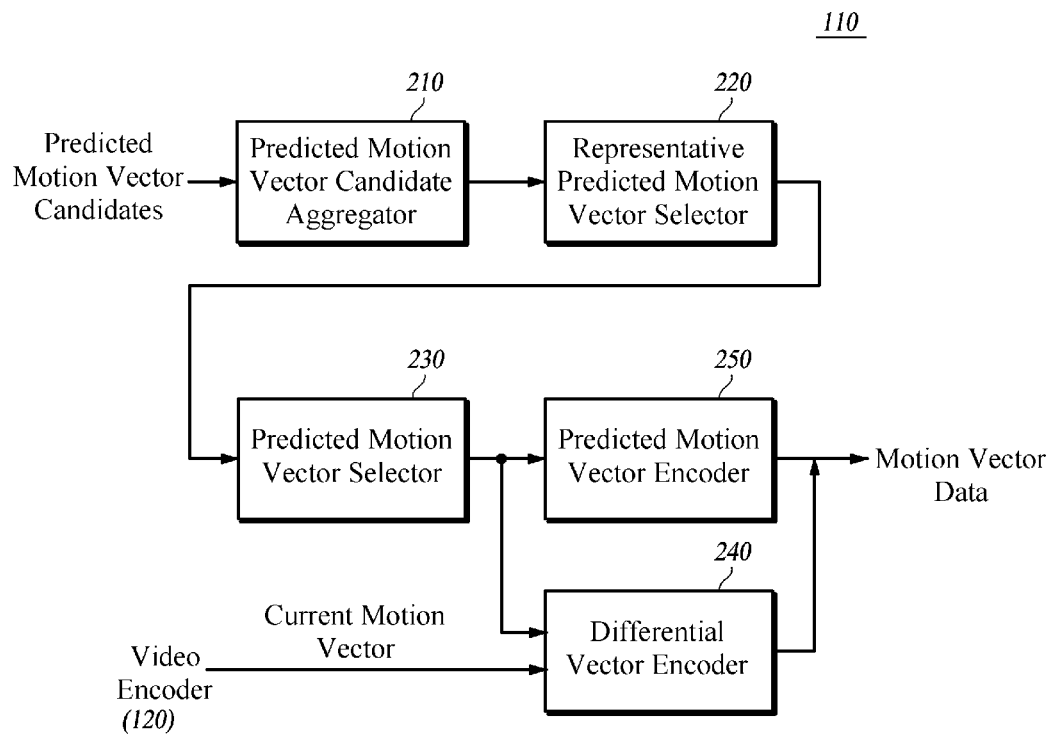
FIG. 2 is a block diagram schematically illustrating a motion vector encoding apparatus according to an embodiment of the present disclosure.

FIG. 2 is a block diagram for schematically illustrating a motion vector encoding apparatus according to an aspect of the present disclosure.

The vector encoding apparatus according to the aspect of the present disclosure may be implemented as the motion vector encoder 110 in the video encoding apparatus 100 aforementioned with reference to FIG. 1, and so is called the motion vector encoder 110 for convenience of description hereinafter.

The motion vector encoder 110 includes a predicted motion vector candidate aggregator 210, a representative predicted motion vector selector 220, a predicted motion vector selector 230, a differential vector encoder 240, and a predicted motion vector encoder 250.

The predicted motion vector candidate aggregator 210 aggregates predicted motion vector candidates of the current block into a plurality of groups.

Here, the predicted motion vector candidates of the current block refer to candidates having a high probability to be determined as predicted motion vectors of the current block. The predicted motion vector candidates may be motion vectors, such as $MV_{H.264}$, $MV_{extspa}$, $MV_a$, $MV_b$, $MV_c$, $MV_d$, $MV_{col}$, and $MV_0$. $MV_{H.264}$, which is a motion vector used as a predicted motion vector in the H.264/AVC compression standard, refers to a motion vector having a median of motion vectors of neighboring blocks of the current block. $MV_{extspa}$ refers to a motion vector used as a predicted motion vector depending on existence or non-existence of neighboring blocks of the current block. $MV_a$, $MV_b$, $MV_c$, and $MV_d$ refer to a motion vector of the neighboring blocks of the current block. $MV_{col}$ refers to a motion vector of a block positioned at the same position as the current block in the reference picture. $MV_0$ refers to a zero vector that is a motion vector of (0, 0).

For example, on an assumption that a block in a left side of the current block is block a, a block in an upper side of the current block is block b, a block in an upper and right side of the current block is block c, and a block in an upper and left side of the current block is block d, a motion vector of block a is $MV_a$, a motion vector of block b is $MV_b$, a motion vector of block c is $MV_c$, and a motion vector of block d is $MV_d$. $MV_{H.264}$ may be calculated with a median of $MV_a$, $MV_b$, and $MV_c$. $MV_{extspa}$ is $MV_{H.264}$ when all of block a, block b, and block c adjacent to the current block are usable, $MV_{extspa}$ is a usable motion vector in an order of $MV_a$, $MV_b$, and $MV_c$ when one or two blocks among block a, block b, and block c are not usable, and $MV_{extspa}$ is $MV_0$ when any of block a, block b, and block c adjacent to the current block are not usable.

However, the aforementioned predicted motion vector candidates of the current block are simply examples for convenience of description, and are not limited to the examples. On the premise that a prearrangement is made between the motion vector encoding apparatus and a motion vector decoding apparatus to be described or between the video encoding apparatus and a video decoding apparatus to be described, only a part of the examples may be used as the predicted motion vector candidates, and other various predicted motion vector candidates may be additionally used, and further all of the aforementioned examples are not used and different predicted motion vector candidates may also be used.

The predicted motion vector candidate aggregator 210 aggregates the predicted motion vector candidates of the current block into a plurality of groups based on their spatial positions. Specifically, the predicted motion vector candidate aggregator 210 appropriately aggregates the predicted motion vector candidates into a plurality of groups considering their spatial positions of the predicted motion vector candidates of the current block. In this event, the predicted motion vector candidate aggregator 210 may select groups including the aggregated predicted motion vector candidates by a random number or a number prearranged between the motion vector encoding apparatus and the motion vector decoding apparatus or the video encoding apparatus and the video decoding apparatus. When the prearranged number of groups are selected, it is not necessary to encode information on the number of groups in order to indicate the number of groups of the aggregated predicted motion vector candidates, but when the random number of groups are selected, the information on the number of groups must be encoded and inserted in a slice header, a picture header, a sequence header, etc.

The predicted motion vector candidate aggregator 210 may classify the is predicted motion vector candidates of the current block based on their spatial positions by using the K-Means algorithm and aggregate the classified predicted motion vector candidates into a plurality of groups. Specifically, the predicted motion vector candidate aggregator 210 may aggregate the predicted motion vector candidates of the current block into the plurality of groups by setting a plurality of predicted motion vector candidates among the predicted motion vector candidates of the current block as medians of the plurality of groups, aggregating a predicted motion vector candidate of which a spatial distance from the median of each group is equal to or shorter than a distance threshold into each group, re-setting a median such that an average of the squares of distances between the aggregated predicted motion vector candidates within each group is equal to or smaller than an average threshold, and repeating a process of aggregating the predicted motion vector candidates into the plurality of groups and resetting the median until the average of the squares of the distances between the aggregated predicted motion vector candidates of each group is equal to or smaller than the average threshold.

Figure 3:
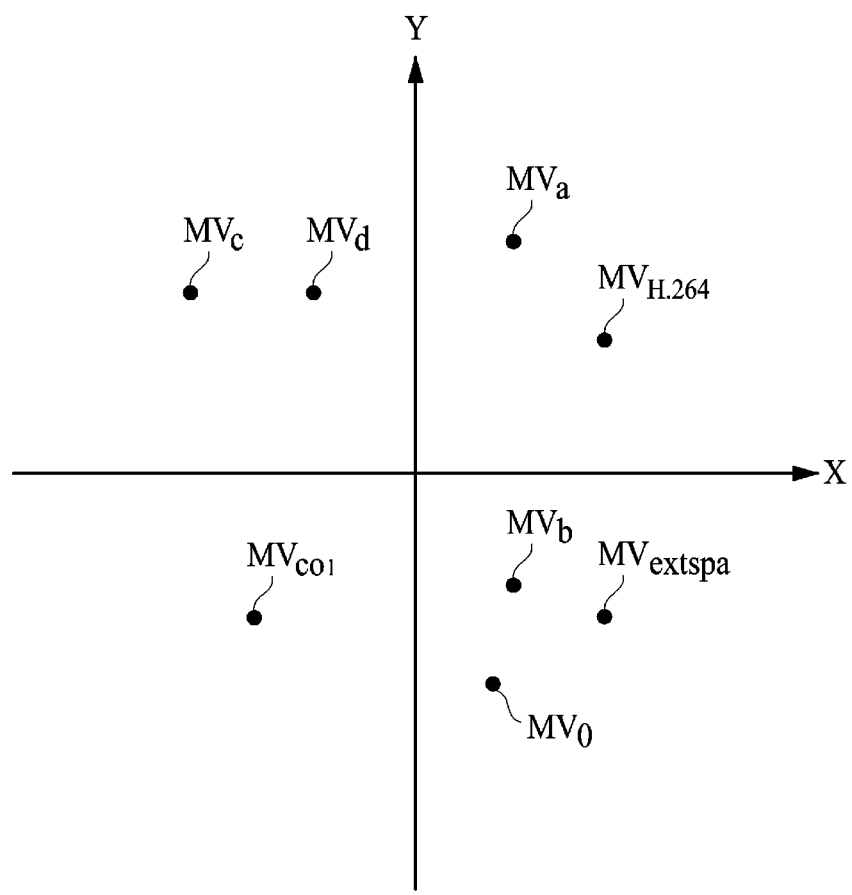
FIGS. 3 to 5 illustrate a process of aggregating predicted motion vector candidates into a plurality of groups based on spatial positions according to an embodiment of the present disclosure.
Figure 4:
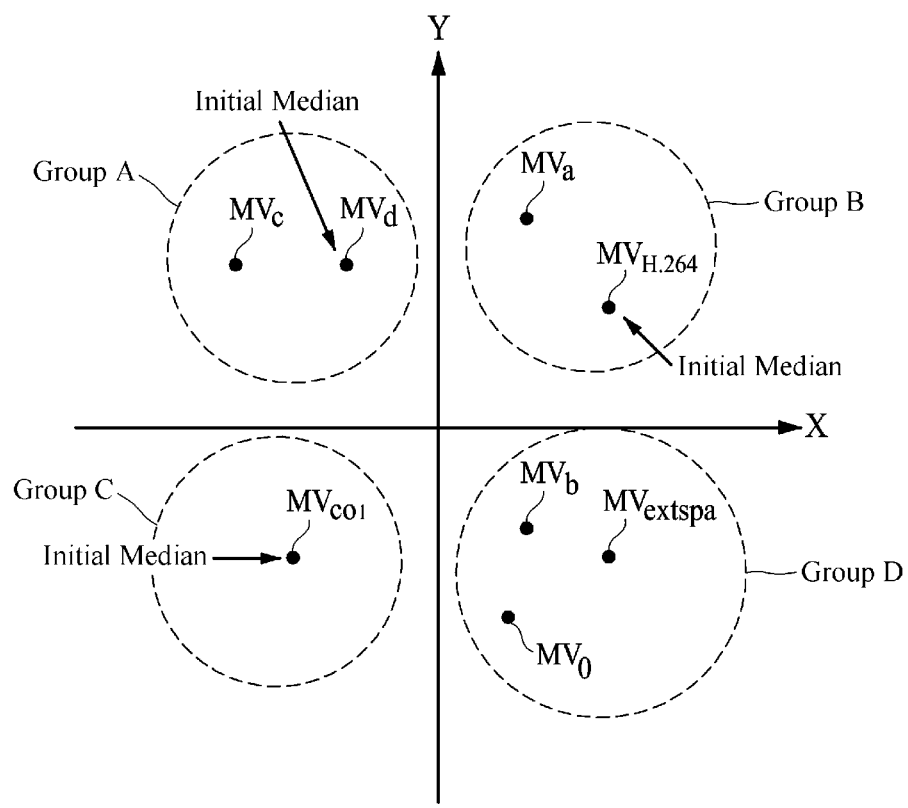
Figure 5:
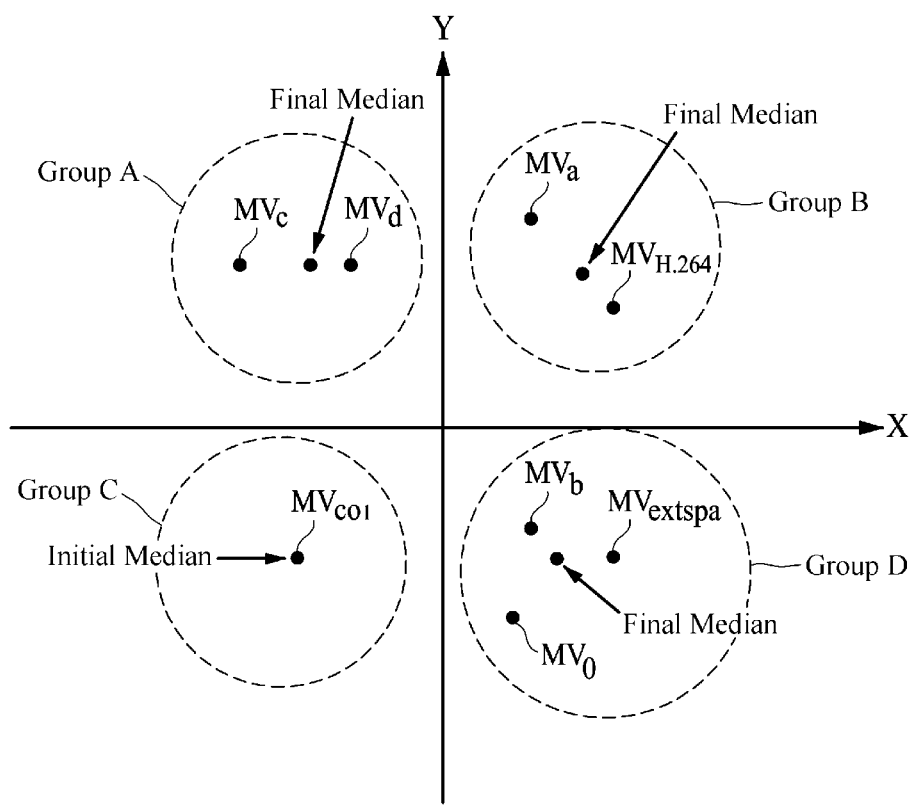

FIGS. 3 to 5 illustrate a process of aggregating predicted motion vector candidates into a plurality of groups based on their spatial positions according to an aspect of the present disclosure.

FIGS. 3 to 5 illustrate an example of a process of classifying the predicted motion vector candidates of the current block based on their spatial positions by using the K-Means algorithm and aggregating the classified predicted motion vector candidates of the current block into the plurality of groups when the predicted motion vector candidates of the current block are set as $MV_{H.264}$, $MV_{extspa}$, $MV_a$, $MV_b$, $MV_c$, $MV_d$, $MV_{col}$, and $MV_0$.

FIG. 3 illustrates an example of the predicted motion vector candidates of the current block represented on an X-Y plane based on their spatial positions. The predicted motion vector candidate aggregator 210 randomly selects a plurality of predicted motion vector candidates of the predicted motion vector candidates illustrated in FIG. 3 and sets the selected predicted motion vector is candidates as median of the plurality of groups.

FIG. 4 illustrates an example of a case in which four predicted motion vector candidates among the predicted motion vector candidates illustrated in FIG. 3 are set as medians of the four groups. The four groups are indicated as group A, group B, group C, and group D, and it is assumed that $MV_d$ is set as an initial median of group A, $MV_{H.264}$ is set as an initial median of group B, $MV_{col}$ is set as an initial median of group C, and $MV_{extspa}$ is set as an initial median of group D.

When the initial medians of the four groups are set as illustrated in FIG. 4, the predicted motion vector candidate aggregator 210 calculates spatial distances between the medians of the respective groups and the predicted motion vector candidates of the current block, selects a predicted motion vector candidate of which the calculated spatial distance from the median is equal to or smaller than a predetermined distance threshold, and aggregates the selected predicted motion vector candidates into the corresponding groups. In FIG. 4, respective distances between $MV_d$ that is set as the initial median of group A and $MV_{H.264}$, $MV_{extspa}$, $MV_a$, $MV_b$, $MV_c$, $MV_d$, $MV_{col}$, and $MV_0$ which are the predicted motion vector candidates of the current block are calculated, and $MV_c$ that is the predicted motion vector candidate of which the calculated distance is equal to or smaller than the predetermined distance threshold and $MV_d$ that is the predicted motion vector candidates set as the median are aggregated into group A. Through the same method, for group B, group C, and group D, distances between the median of each group and the predicted motion vector candidates are calculated and the predicted motion vector candidate of which the calculated distance is equal to or smaller than the predetermined distance threshold are aggregated into the corresponding group, so that $MV_a$ and $MV_{H.264}$ are aggregated into group B, $MV_{col}$ is aggregated into group C, and $MV_b$, $MV_{extspa}$, and $MV_0$ are aggregated into group D.

FIG. 5 illustrates an example of a case of resetting medians of the groups of the aggregated predicted motion vector candidates based on the initial medians as illustrated in FIG. 4.

When the groups including the aggregated predicted motion vector candidates based on the initial medians are formed, the predicted motion vector candidate aggregator 210 resets a median such that an average of squares of the distances between the initial median and the predicted motion vector candidates within each group is equal to or smaller than a predetermined average threshold for the respective groups including the aggregated predicted motion vector candidates based on the initial medians.

In FIG. 5, the median is reset such that a distance between $MV_a$ that is the predicted motion vector candidate and $MV_d$ is equal to or smaller than the predetermined average threshold, so that a new median is set between $MV_a$ and $MV_d$. Similarly, new medians are set for group B, group C, and group D as illustrated in FIG. 5.

Then, the predicted motion vector candidate aggregator 210 calculates spatial distances between the reset median and the predicted motion vector candidates of the current block of each group, selects a predicted motion vector candidate of which the calculated distance from the median is equal to or shorter than the predetermined distance threshold, aggregates the selected predicted motion vector candidate into the corresponding group, and repeats a process of resetting a median such that an average of the squares of the distances between the predicted motion vector candidates within each group is equal to or smaller than the predetermined average threshold. In the repeat of the process, the predicted motion vector candidates aggregated into the respective groups may be differentiated, and thus the predicted motion vector candidates are aggregated such that the average of the squares of the distances between the predicted motion vector candidates within each group is equal to or smaller than the predetermined average threshold. If the average of the squares of the distances between the predicted motion vector candidates within each group including the predicted motion vector candidates aggregated based on the initial median or the reset median is already equal to or smaller than the predetermined average threshold, the predicted motion vector candidate aggregator 210 does not reset the median, but sets the set median as a final median, and determines a group including the predicted motion vector candidates aggregated based on a corresponding final median as a final group. FIG. 5 illustrates a case in which the reset median is a final median.

Referring to FIG. 2 again, the representative predicted motion vector selector 220 selects a representative predicted motion vector for each group by selecting one predicted motion vector candidate from the aggregated predicted motion vector candidates within each group as the representative predicted motion vector. In this case, as illustrated in FIG. 6, the representative predicted motion vector selector 220 may select the representative predicted motion vector for each group by selecting a predicted motion vector candidate of which a spatial distance from the median of the predicted motion vector candidates within each group is shortest from the predicted motion vector candidates aggregated within each group by the predicted motion vector candidate aggregator 210.

Figure 6:
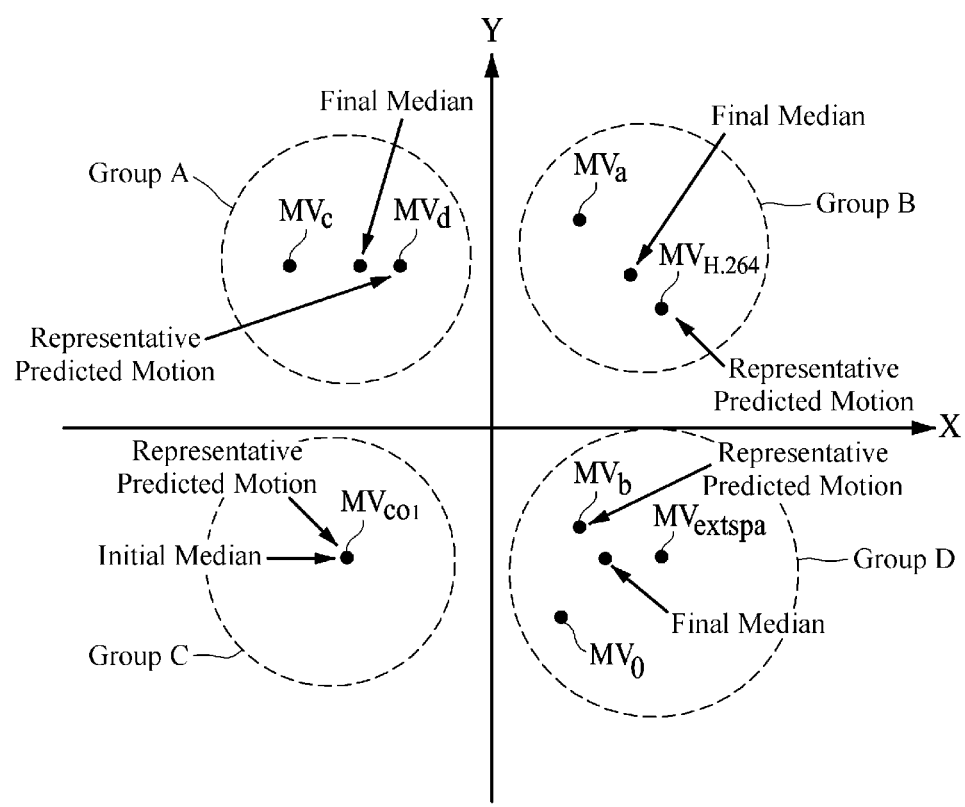
FIG. 6 illustrates a process of selecting a representative predicted motion vector for each group according to an embodiment of the present disclosure.

FIG. 6 illustrates a process of selecting a representative predicted motion vector for each group according to an aspect of the present disclosure.

FIG. 6 illustrates an example of selected representative predicted motion vectors for each group when the predicted motion vector candidates are aggregated into the four groups and the final medians are set as illustrated in FIG. 5.

As illustrated in FIG. 6, $MV_d$ is closer to the final median than $MV_c$ in group A, so that $MV_d$ is selected as the representative predicted motion vector. $MV_{H.264}$ is closer to the final median than $MV_a$ in group B, so that $MV_{H.264}$ is selected as the representative predicted motion vector. $MV_{col}$ is the final median in group C, so that $MV_{col}$ is selected as the representative predicted motion vector. $MV_b$ is closer to the final median than other motion vectors $MV_{extspa}$ and $MV_0$ in group D, so that $MV_b$ is selected as the representative predicted motion vector.

Referring to FIG. 2, the predicted motion vector selector 230 selects one representative predicted motion vector from the representative predicted motion vectors for the respective groups as a predicted motion vector. Here, the predicted motion vector selector 230 may select one representative predicted is motion vector from the representative predicted motion vectors for the respective groups by using rate-distortion costs. Specifically, the predicted motion vector selector 230 may calculate rate-distortion costs generated according to the encoding of the current block when the representative predicted motion vectors for the respective groups are used, and select a representative predicted motion vector of a group having the minimum calculated rate-distortion costs as the predicted motion vector of the current block. However, the rate-distortion costs are a simple example usable for selection of the predicted motion vector, and it is not essentially necessary to select the predicted motion vector from the representative predicted motion vectors for the respective groups by using the rate-distortion costs, and the predicted motion vector may be selected by using other various encoding costs.

The differential vector encoder 240 encodes a differential vector that is a difference between the current motion vector of the current block and the selected predicted motion vector. Specifically, the differential vector encoder 240 calculates the differential vector by subtracting the predicted motion vector selected by the predicted motion vector selector 230 from the current motion vector determined by the video encoder 120 and encodes the differential vector, to generate a differential vector data. However, when the predicted motion vector selector 230 calculates and encodes the differential vector in order to calculate the rate-distortion costs, the differential vector encoder 240 does not separately encode the differential vector, but outputs the differential vector data encoded by the predicted motion vector selector 230. The encoding of the differential vector may use an entropy coding method, such as a fixed length coding, a variable length coding, an arithmetic coding.

The predicted motion vector encoder 250 encodes the group index indicating a group including the representative predicted motion vector selected as the predicted motion vector. That is, the predicted motion vector encoder 250 identifies a group including the representative predicted motion vector selected as the predicted motion vector by the predicted motion vector selector 230 and encodes a group index indicating the corresponding group, to generate a group index data. The group index refers to an index for identifying a group, such as is group A, group B, group C, and group D, or a first group, a second group, a third group, and a fourth group, and the encoding of the group index may use an entropy coding method, such as a fixed length coding, a variable length coding, an arithmetic coding, similar to the encoding of the differential vector.

For example, in a case where the predicted motion vectors are aggregated into the four groups, group A, group B, group C, and group D, when the group index is encoded using the fixed length coding, the group index data for group A may be encoded to "00", the group index data for group B may be encoded to "01", the group index data for group C may be encoded to "10", and the group index data for group D may be encoded to "11".

In the meantime, as described above, the predicted motion vector selector 230 may select one representative predicted motion vector from the representative predicted motion vector for the respective groups as the predicted motion vector, but may determine if a spatial distance between the plurality of groups is equal to or shorter than a predetermined reference distance, select the median of the predicted motion vector candidates of the current block as the predicted motion vector when the spatial distance between the plurality of groups is equal to or shorter than the predetermined reference distance, and select one representative predicted motion vector among the representative predicted motion vectors for the respective groups as the predicted motion vector only when the spatial distance between a plurality of groups is longer than the predetermined reference distance.

When the predicted motion vector selector 230 selects the median of the predicted motion vector candidates of the current block as the predicted motion vector because the spatial distance between the plurality of groups is equal to or shorter than the predetermined reference distance, the predicted motion vector encoder 250 may not encode the group index. This is because, likewise to the motion vector encoding apparatus or the video encoding apparatus, the motion vector decoding apparatus or the video decoding apparatus may aggregate the predicted motion vector candidates of the current block into the plurality of groups and determine if the spatial distance between the plurality of groups is equal to or shorter than the predetermined reference distance.

Figure 7:
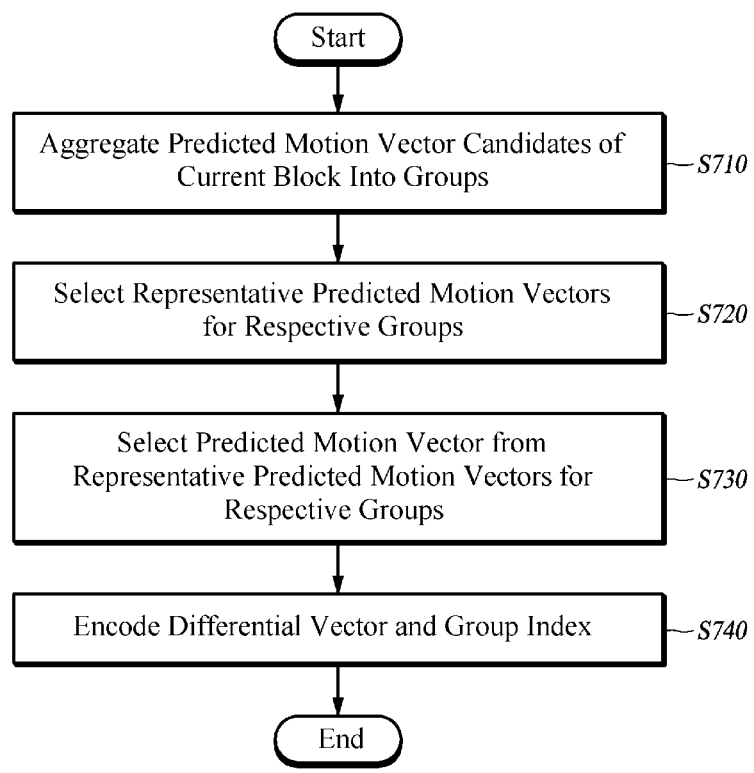
FIG. 7 is a flowchart illustrating a motion vector encoding method according to an embodiment of the present disclosure.

FIG. 7 is a flowchart illustrating a motion vector encoding method according to an aspect of the present disclosure.

According to the motion vector encoding method according to the aspect of the present disclosure, the motion vector encoder 110 aggregates predicted motion vector candidates of a current block into a plurality of groups (S710), selects one predicted motion vector candidate from the aggregated predicted motion vector candidates within each group as the representative predicted motion vector for each group (S720), selects one representative predicted motion vector from the representative predicted motion vectors for the respective groups as a predicted motion vector (S730), and encodes a differential vector that is a difference between a current motion vector of the current block and the selected predicted motion vector (S740). Further, the motion vector encoder 110 may additionally encode a group index indicating a group including the one representative predicted motion vector selected as the predicted motion vector, as well as the differential vector.

At step S710, the motion vector encoder 110 may aggregate the predicted motion vector candidates of the current block into the plurality of groups based on their spatial positions, by, for example, setting a plurality of predicted motion vector candidates among the predicted motion vector candidates of the current block as medians of the plurality of groups, aggregating a predicted motion vector candidate of which a spatial distance from the median of each group is equal to or shorter than a distance threshold into each group, re-setting a median such that an average of the squares of distances of the aggregated predicted motion vector candidates within each group is equal to or smaller than an average threshold, and repeating a process of aggregating the predicted motion vector candidates into the respective groups and resetting the medians until the average of the squares of the distances between the aggregated predicted motion vector candidates of each group is equal to or smaller than the average threshold.

At step S720, the motion vector encoder 110 select the representative predicted motion vector for each group by selecting a predicted motion vector candidate of which a spatial distance from the median of the predicted motion vector candidates within each group is shortest from the predicted motion vector candidates within each group.

At step S730, the motion vector encoder 110 may select one representative predicted motion vector from the representative predicted motion vectors for the respective groups by using rate-distortion costs.

Further, the motion vector encoder 110 may select the median of the predicted motion vector candidates of the current block as the predicted motion vector when respective spatial distances between the plurality of groups are equal to or shorter than a predetermined reference distance. In this case, the motion vector encoder does not encode the group index.

Figure 8:
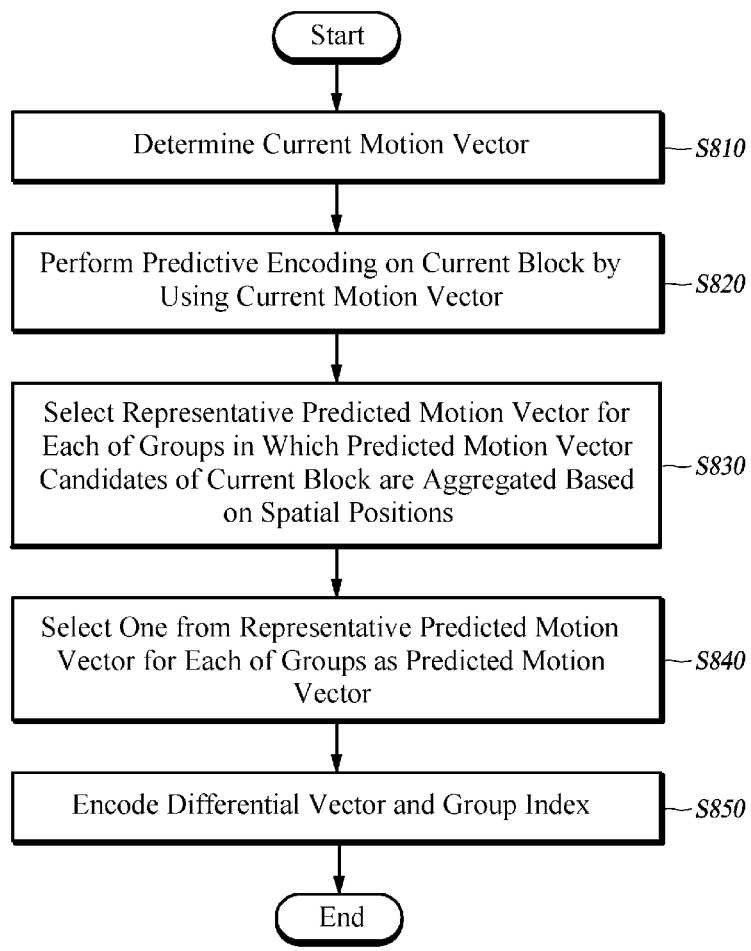
FIG. 8 is a flowchart illustrating a video encoding method according to an embodiment of the present disclosure.

FIG. 8 is a flowchart illustrating a video encoding method according to an aspect of the present disclosure.

According to the video encoding method according to the aspect of the present disclosure, the video encoding apparatus 100 determines a current motion vector that is a motion vector of a current block (S810), performs a predictive encoding on the current block by using the determined current motion vector (S820), selects representative predicted motion vectors for each of a plurality of groups in which the predicted motion vector candidates of the current block are aggregated based on their spatial positions (S830), selects one representative predicted motion vector among the representative predicted motion vectors for the respective groups (S840), and encodes a group index indicating a group including a differential vector that is a difference between the determined current motion vector and the selected predicted motion vector and the selected one representative predicted motion vector (S850).

Figure 9:
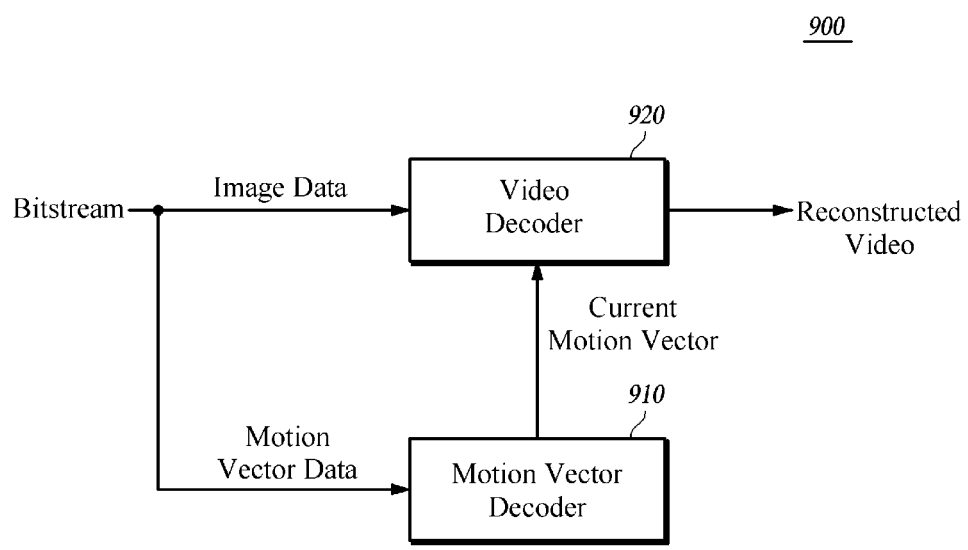
FIG. 9 is a block diagram illustrating a video decoding apparatus according to an embodiment of the present disclosure.

FIG. 9 is a block diagram illustrating a video decoding apparatus according to an aspect of the present disclosure.

The video decoding apparatus 900 according to the aspect of the present disclosure includes a motion vector decoder 910 and a video decoder 920.

The motion vector decoder 910 reconstructs a differential vector and a group index by decoding a motion vector data extracted from a bitstream, selects is representative predicted motion vectors for each of a plurality of groups in which predicted motion vector candidates of a current block are aggregated based on their spatial positions, selects a representative predicted motion vector of a group indicated by the reconstructed group index from the representative predicted motion vectors for the respective groups as a predicted motion vector, and reconstructs a current motion vector of the current block by adding the reconstructed differential vector to the selected predicted motion vector. The motion vector decoder 910 will be described in the following process with reference to FIG. 10 in detail.

The video decoder 920 reconstructs the current block by performing a predictive decoding on an image data extracted from the bitstream by using the reconstructed current motion vector. To this end, the video decoder 920 may include a decoder, an inverse quantizer and inverse transformer, a predictor, an adder, a deblocking filter, a memory, etc. Here, the decoder reconstructs a transformed and quantized coefficient by decoding the image data extracted from the bitstream. The inverse quantizer and inverse transformer reconstructs a residual block by inversely quantizing and inversely transforming the reconstructed transformed and quantized coefficient. The predictor generates a predicted block by compensating for motion of a current block by using the current motion vector of the current block reconstructed by the motion vector decoder 910. The adder reconstructs the current block by adding the reconstructed residual block to the predicted block. The reconstructed current block is deblocking-filtered by the deblocking filter, accumulated in the unit of pictures, and output as a reconstructed image or stored in the memory so that the predictor uses the stored current block for prediction of a next block or a next picture.

Figure 10:
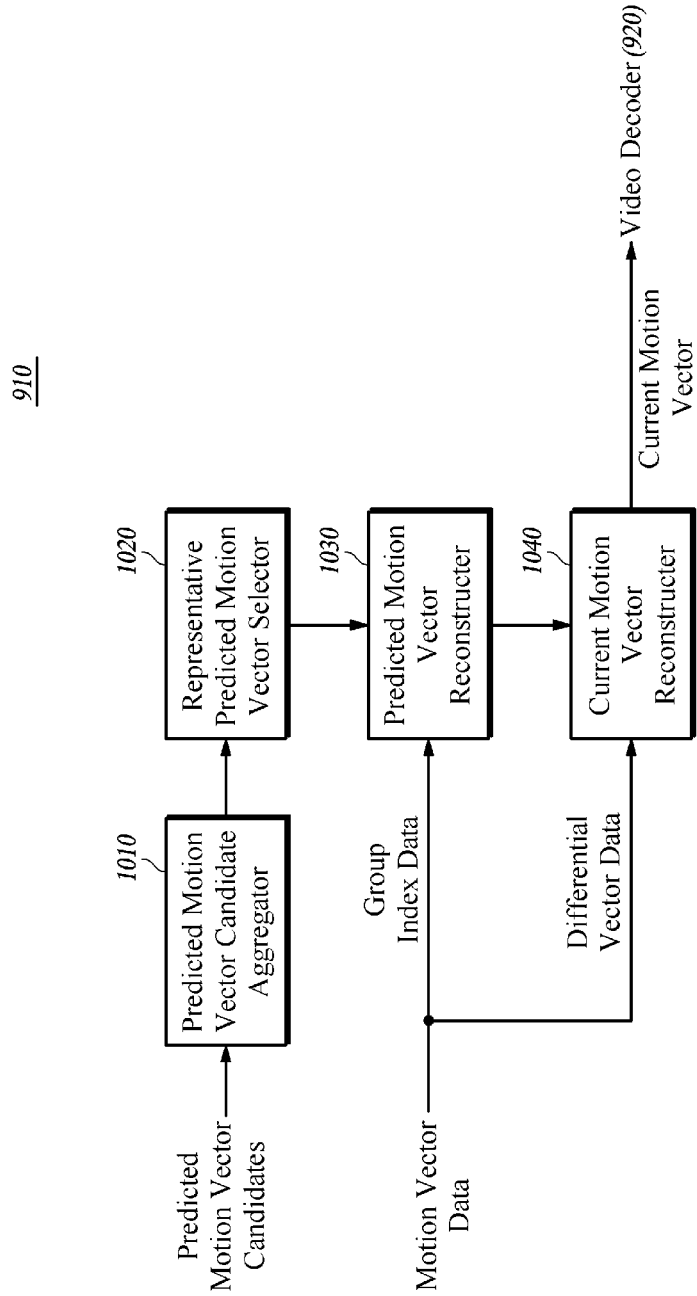
FIG. 10 is a block diagram illustrating a motion vector decoding apparatus according to an embodiment of the present disclosure.

FIG. 10 is a block diagram schematically illustrating a motion vector decoding apparatus according to an aspect of the present disclosure.

The motion vector decoding apparatus according to the aspect of the present disclosure may be implemented as the motion vector decoder 910 in the video decoding apparatus 900 aforementioned with reference to FIG. 9. Hereinafter, the motion vector decoding apparatus according to the aspect of the present disclosure is called the motion vector decoder 910.

The motion vector decoder 910 includes a predicted motion vector candidate aggregator 1010, a representative predicted motion vector selector 1020, a predicted motion vector reconstructor 1030, and a current motion vector reconstructor 1040.

The predicted motion vector aggregator 1010 aggregates predicted motion vector candidates of a current block into a plurality of groups. The representative predicted motion vector selector 1020 selects a representative predicted motion vector for each group by selecting one predicted motion vector candidate from the aggregated predicted motion vector candidates within each group as the representative predicted motion vector. Here, the predicted motion vector candidate aggregator 101 and the representative predicted motion vector selector 1020 are the same as or similar to the predicted motion vector aggregator 210 and the representative predicted motion vector selector 220 aforementioned with reference to FIG. 2, so their detailed description will be omitted.

The predicted motion vector reconstructor 1030 reconstructs the group index by decoding a group index data extracted from a motion vector data and selects a representative predicted motion vector of a group identified by the reconstructed group index from the representative predicted motion vectors for the respective groups. For example, when the representative predicted motion vectors for the respective groups are selected by the representative predicted motion vector selector 1020 as illustrated in FIG. 6, and a group identified by the group index reconstructed by decoding a group index data "11" is group D, the predicted motion vector constructer 1030 reconstructs $MV_b$ selected as the representative predicted motion vector in group D as a predicted motion vector.

The current motion vector reconstructor 1040 reconstructs a differential vector by decoding a differential vector data extracted from the motion vector data and reconstructs the reconstructed differential vector and the selected predicted motion vector as the current motion vector of the current block. For example, when the differential vector reconstructed through the decoding of the differential vector data is $MV_0$ and the predicted motion vector reconstructed by the predicted motion vector reconstructor 1030 is $MV_b$ as described in the aforementioned example, $MV_b$ is reconstructed as the current motion vector.

In the meantime, the predicted motion vector reconstructor 1030 may select the representative predicted motion vector of the group identified by the reconstructed group index from the representative predicted motion vectors for the respective groups as the predicted motion vector as described above, but a median of the predicted motion vector candidates of the current block may be selected as the predicted motion vector. That is, the predicted motion vector reconstructor 1030 may determine if the group index data is extracted from the motion vector data, select the representative predicted motion vector of the group identified by the reconstructed group index among the representative predicted motion vectors for the respective groups as the predicted motion vector as described above when the group index data is extracted, and select a median of the predicted motion vector candidates of the current block as the predicted motion vector when the group index data is not extracted.

Figure 11:
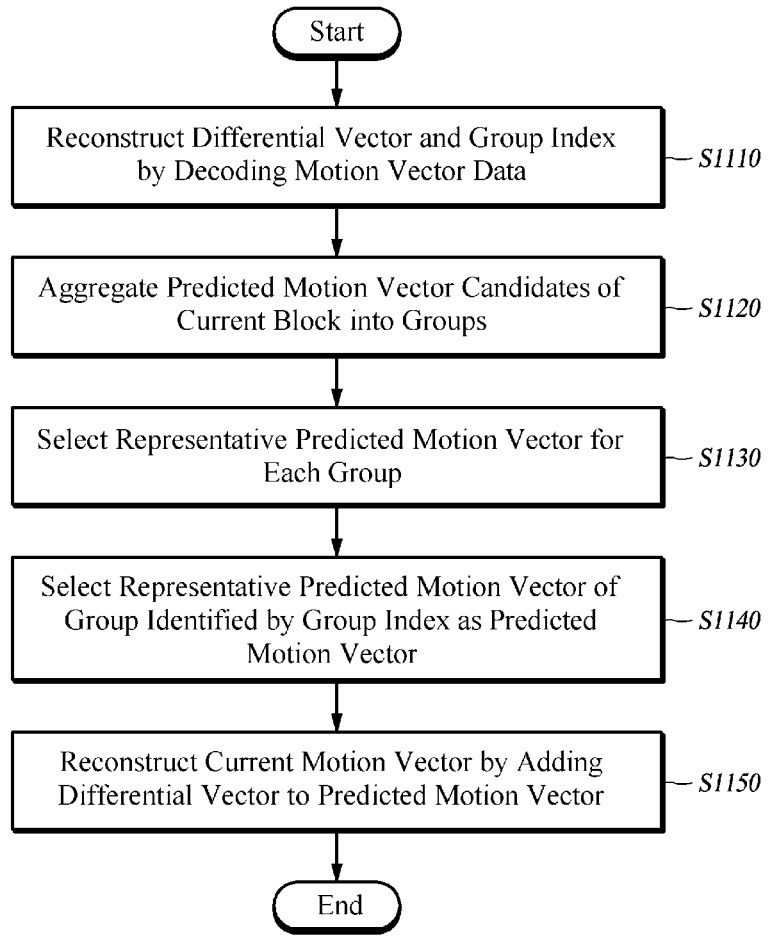
FIG. 11 is a flowchart illustrating a motion vector decoding method to according to an embodiment of the present disclosure.

FIG. 11 is a flowchart illustrating a motion vector decoding method according to an aspect of the present disclosure.

According to the motion vector decoding method according to the aspect of the present disclosure, the motion vector decoder 910 reconstructs a differential vector and a group index by decoding a motion vector data and a group index data extracted from a motion vector data (S1110), aggregates predicted motion vector candidates of the current block into a plurality of groups (S1120), selects one predicted motion vector candidate from the aggregated predicted motion vector candidates within each group as a representative predicted motion vector as a representative predicted motion vector for each group (S1130), selects a representative predicted motion vector of a group identified by the reconstructed group index from the representative predicted motion vectors for the respective groups (S1140), and reconstructs a current motion vector of the current block by adding the reconstructed differential vector and the selected predicted motion vector (S1150).

At step S1120, the motion vector decoder 910 may aggregate the predicted motion vector candidates of the current block into the plurality of groups based on their spatial positions. For example, the motion vector decoder 910 may aggregate the predicted motion vector candidates of the current block into the plurality of groups by setting a plurality of predicted motion vector candidates among the predicted motion vector candidates of the current block as medians of the plurality of groups, aggregating a predicted motion vector candidate of which a spatial distance from the median of each group is equal to or shorter than a distance threshold into each group, resetting a median such that an average of the squares of distances between the aggregated predicted motion vector candidates within each group is equal to or smaller than an average threshold for each group, and repeating a process of aggregating the predicted motion vector candidates into the respective groups and resetting the medians until the average of the squares of the distances between the aggregated predicted motion vector candidates of each group is equal to or smaller than the average threshold.

At step S1130, the motion vector decoder 910 may select the representative predicted motion vector for each group by selecting a predicted motion vector candidate of which a spatial distance from the median of the predicted motion vector candidates within each group is shortest from the predicted motion vector candidates aggregated within each group.

Further, the motion vector decoder 910 may determine if the group index data is extracted from the motion vector data, and select the median of the predicted motion vector candidates of the current block as the predicted motion vector when the group index data is not extracted.

Figure 12:
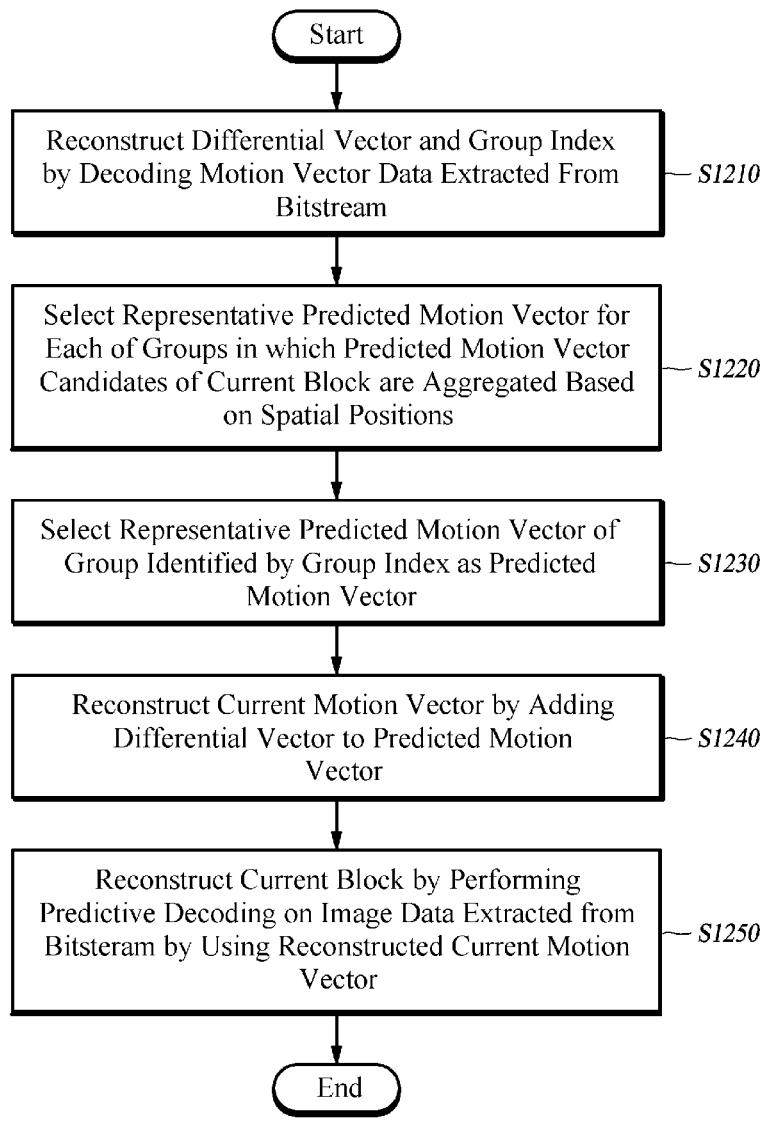
FIG. 12 is a flowchart illustrating a video decoding method according to an embodiment of the present disclosure.

FIG. 12 is a flowchart illustrating a video decoding method according to an aspect of the present disclosure.

According to the video decoding method according to the aspect of the present disclosure, the video decoding apparatus 900 reconstructs a differential vector and a group index by decoding a motion vector data extracted from a is bitstream (S1210), selects representative predicted motion vectors for each of a plurality of groups in which predicted motion vector candidates of the current block are aggregated based on their spatial positions (S1220), selects a representative predicted motion vector of a group identified by the reconstructed group index from the representative predicted motion vectors for the respective groups as a predicted motion vector (S1230), reconstructs a current motion vector of a current block by adding the reconstructed differential vector and the selected predicted motion vector (S1240), and reconstructs the current block by performing a predictive decoding on an image data extracted from the bitstream by using the reconstructed current motion vector (S1250).

As described above, according to the aspect of the present disclosure, even if a predicted motion vector is selected by using a plurality of predicted motion vector candidates and a predictive encoding is performed on a motion vector by using the selected predicted motion vector by classifying and aggregating predicted motion vector candidates of a block to be encoded into a plurality of groups based on their spatial positions, selecting a representative predicted motion vector for each group, and selecting an optimum representative predicted motion vector as a predicted motion vector in an aspect of a rate-distortion, a quantity of bits generated due to an encoding of a side information for indicating which predicted motion vector is selected may be controlled, thereby improving the efficiency of the encoding of the motion vector and thus ultimately improving the compression efficiency of a video.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or is code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is highly useful for application in the fields of compressing a video, in which a video is encoded and decoded, by suppressing a quantity of bits caused by encoding a side information for indicating which predicted motion vector is selected while reducing a size of a differential vector to be encoded through a selection of a predicted motion vector by using a plurality of predicted motion vector candidates, thus improving the motion vector encoding efficiency and ultimately improving the video compression efficiency.

The invention claimed is:

1. An apparatus for encoding a current motion vector of a current block in a current frame, the apparatus comprising:
a motion vector selector configured to determine a plurality of motion vector candidates derived from first multiple neighboring positions in the current frame and second multiple neighboring positions in the current frame by
deriving a first motion vector candidate of the plurality of motion vector candidates by using first multiple neighboring motion vectors corresponding respectively to the first multiple neighboring positions, and
deriving a second motion vector candidate of the plurality of motion vector candidates by using second multiple neighboring motion vectors corresponding respectively to the second multiple neighboring positions, wherein the first multiple neighboring positions and the second multiple neighboring positions are adjacent to the current block;

a predicted motion vector selector configured to
select a motion vector among the plurality of motion vector candidates, and
set the motion vector selected among the plurality of motion vector candidates, as a predicted motion vector of the current motion vector;

a differential vector encoder configured to encoded a differential vector representing a difference between the current motion vector and the predicted motion vector, and a predicted motion vector encoder configured to encode an index for identifying the motion vector selected among the plurality of motion vector candidates, wherein each of the first multiple neighboring positions is different from each of the second multiple neighboring positions.

2. An apparatus for decoding a current motion vector of a current block in a current frame, the apparatus comprising:

a motion vector selector configured to determine a plurality of motion vector candidates derived from first multiple neighboring positions in the current frame and second multiple neighboring positions in the current frame by
derivinga first motion vector candidate of the plurality of motion vector candidates by using first multiple neighboring motion vectors corresponding respectively to the first multiple neighboring positions, and
deriving a second motion vector candidate of the plurality of motion vector candidates by using second multiple neighboring motion vectors corresponding respectively to the second multiple neighboring positions, wherein the first multiple neighboring positions and the second multiple neighboring positions are adjacent to the current block;

a predicted motion vector reconstructor configured to
reconstruct an index for reconstructing a predicted motion vector of the current motion vector by decoding an index data extracted from a bitstream
select a motion vector among the plurality of motion vector candidates, and
set the motion vector selected among the plurality of motion vector candidates, as a predicted motion vector of the current motion vector; and a current motion vector reconstructor configured to
reconstruct a differential vector representing a difference between the current motion vector and the predicted motion vector by decoding a differential vector data extracted from the bitstream, and
reconstruct the current motion vector of the current block by adding the reconstructed differential vector and the predicted motion vector, wherein each of the first multiple neighboring positions is different from each of the second multiple neighboring positions.

3. A method of encoding a current motion vector of a current block in a current frame, the method comprising:
determining a plurality of motion vector candidates derived from first multiple neighboring positions in the current frame and second multiple neighboring positions in the current frame by
deriving a first motion vector candidate of the plurality of motion vector candidates by using first multiple neighboring motion vectors corresponding respectively to the first multiple neighboring positions, and
deriving a second motion vector candidate of the plurality of motion vector candidates by using second multiple neighboring motion vectors corresponding respectively to the second multiple neighboring positions, wherein the first multiple neighboring positions and the second multiple neighboring positions are adjacent to the current block;

selecting a motion vector among the plurality of motion vector candidates;

setting the motion vector selected among the plurality of motion vector candidates, as a predicted motion vector of the current motion vector;

encoding a differential vector representing a difference between a current motion vector and the predicted motion vector; and encoding an index for identifying the motion vector selected among the plurality of motion vector candidates, wherein each of the first multiple neighboring positions is different from each of the second multiple neighboring positions.

4. The method of claim 3, wherein the deriving of the first motion vector comprises:
determining a motion vector from the first multiple neighboring motion vectors, based on a spatial distance from a median of the first multiple neighboring motion vectors to the motion vector determined from the first multiple neighboring motion vectors, and
setting the motion vector, determined from the first multiple neighboring motion vectors, as the first motion vector candidate.

5. The method of claim 3, wherein the predicted motion vector is generated from the plurality of motion vectors by using rate-distortion costs.

6. The method of claim 3, wherein a median a plurality of neighboring motion vectors including the first multiple neighboring motion vectors and the second multiple neighboring motion vectors is selected as the predicted motion vector, when a spatial distance between the plurality of groups of neighboring motion vectors is equal to or shorter than a predetermined reference distance.

7. A method of decoding a current motion vector of a current block in a current frame, the method comprising:
reconstructing a differential vector representing a difference between the current motion vector and a predicted motion vector of the current motion vector by decoding a differential vector data from a bitstream;
reconstructing an index for reconstructing the predicted motion vector by decoding an index data extracted from the bitstream;
determining a plurality of motion vector candidates derived from first multiple neighboring positions in the current frame and second multiple neighboring positions in the current frame, both of which are adjacent to the current block, by
deriving a first motion vector candidate of the plurality of motion vector candidates by using first multiple neighboring motion vectors corresponding respectively to the first multiple neighboring positions, and
deriving a second motion vector candidate of the plurality of motion vector candidates by using second multiple neighboring motion vectors corresponding respectively to the second multiple neighboring positions, wherein the first multiple neighboring positions and the second multiple neighboring positions are adjacent to the current block;

selecting a motion vector identified by the index among the plurality of motion vector candidates;

setting the motion vector selected among the plurality of motion vector candidates, as the predicted motion vector of the current motion vector; and reconstructing the current motion vector of the current block by adding the reconstructed differential vector and the predicted motion vector;

wherein each of the first multiple neighboring positions is different from each of the second multiple neighboring positions.

8. The method of claim 7, wherein the deriving of the first motion vector comprises:

determining a motion vector from the first multiple neighboring motion vectors, based on a spatial distance from a median of the first multiple neighboring motion vectors to the motion vector determined from the first multiple neighboring motion vectors, and setting the motion vector, determined from the first multiple neighboring motion vectors, as the first motion vector candidate.

9. The method of claim 7, further comprising:

determining whether the index is extracted from the bitstream; and selecting a median of the plurality of neighboring predicted motion as the predicted motion vector, when the index is not extracted from the bitstream.

10. The apparatus of claim 2, wherein one of the second multiple neighboring positions is in a reference frame reconstructed prior to the current frame, and said one of the second multiple neighboring positions in the reference frame is determined based on a position of the current block in the current frame.

* * * * *